(12) United States Patent
Kerzner

(10) Patent No.: US 9,507,755 B1
(45) Date of Patent: Nov. 29, 2016

(54) SELECTING CONTENT FOR PRESENTATION

(71) Applicant: MicroStrategy Incorporated, Vienna, VA (US)

(72) Inventor: Dan Kerzner, McLean, VA (US)

(73) Assignee: Micro Strategy Incorporated, Vienna, VA (US)

( * ) Notice: Subject to any disclaimer, the term of this patent is extended or adjusted under 35 U.S.C. 154(b) by 376 days.

(21) Appl. No.: 13/682,021

(22) Filed: Nov. 20, 2012

(51) Int. Cl.
*G06F 17/00* (2006.01)

(52) U.S. Cl.
CPC .................................. *G06F 17/00* (2013.01)

(58) Field of Classification Search
CPC .... G06T 15/005; G06T 19/00; G06T 11/001
See application file for complete search history.

(56) References Cited

U.S. PATENT DOCUMENTS

| | | | |
|---|---|---|---|
| 4,973,952 A | 11/1990 | Malec et al. | |
| 5,553,312 A | 9/1996 | Gattey et al. | |
| 5,979,757 A | 11/1999 | Tracy et al. | |
| 6,067,525 A | 5/2000 | Johnson et al. | |
| 6,125,356 A | 9/2000 | Brockman et al. | |
| 6,434,530 B1 | 8/2002 | Sloane et al. | |
| 6,446,076 B1 | 9/2002 | Burkey et al. | |
| 6,542,602 B1 | 4/2003 | Elazar et al. | |
| 7,899,698 B2 | 3/2011 | Wan et al. | |
| 2001/0040591 A1* | 11/2001 | Abbott et al. | 345/700 |
| 2002/0006126 A1 | 1/2002 | Johnson et al. | |
| 2002/0133545 A1 | 9/2002 | Fano et al. | |
| 2002/0160772 A1 | 10/2002 | Gailey et al. | |
| 2006/0277079 A1* | 12/2006 | Gilligan et al. | 705/6 |
| 2008/0195651 A1* | 8/2008 | Rachmiel et al. | 707/102 |
| 2012/0060177 A1* | 3/2012 | Stinson et al. | 725/12 |
| 2012/0278381 A1* | 11/2012 | Ferlitsch et al. | 709/203 |
| 2013/0120243 A1* | 5/2013 | Kim et al. | 345/156 |

FOREIGN PATENT DOCUMENTS

| | | |
|---|---|---|
| EP | 1076329 | 2/2001 |
| WO | WO 99/14688 | 3/1999 |
| WO | WO 02/073331 | 9/2002 |

OTHER PUBLICATIONS

"SAP Augmented Corporate Reality Proof of Concept" [online] [Retrieved on Jul. 14, 2011] Retrieved from the Internet: http://timoelliott.com/blog/2010/02/sap-augmented-corporate-reality-proof-of-concept.htm. (Feb. 4, 2010) 19 pages.

(Continued)

*Primary Examiner* — Michelle Chin
(74) *Attorney, Agent, or Firm* — Fish & Richardson P.C.

(57) ABSTRACT

In one implementation, a computer-implemented method includes identifying, at a computer system, a plurality of users who are located within a threshold distance of a display device; selecting, by the computer system, a subset of the plurality of users based, at least in part, on location information that indicates current locations of the plurality of users relative to a location of the display device; identifying, by the computer system, roles within one or more organizations of individual users within the subset of the plurality of users; selecting content to present on the display device based, at least in part, on identities of the individual users within the subset of the plurality of users and the roles of the individual users within the subset of the plurality of users; and causing, by the computer system, the selected content to be presented on the display device.

21 Claims, 7 Drawing Sheets

(56) References Cited

OTHER PUBLICATIONS

"Augmented Corporate Reality Business Intelligence Prototype" [online] [Retrieved on Jul. 14, 2011] Retrieved from the Internet: http://timoelliot.com/blog/2010/07/new-augmented-corporate-reality-bi-prototype.html 26 pages.

"Augmented Business Intelligence Reality?" [online] [Retrieved on Nov. 20, 2012] Retrieved from the Internet: http://timoelliott.com/blog2009/07/augmented-business-intelligence-reality.html. 5 pages.

\* cited by examiner

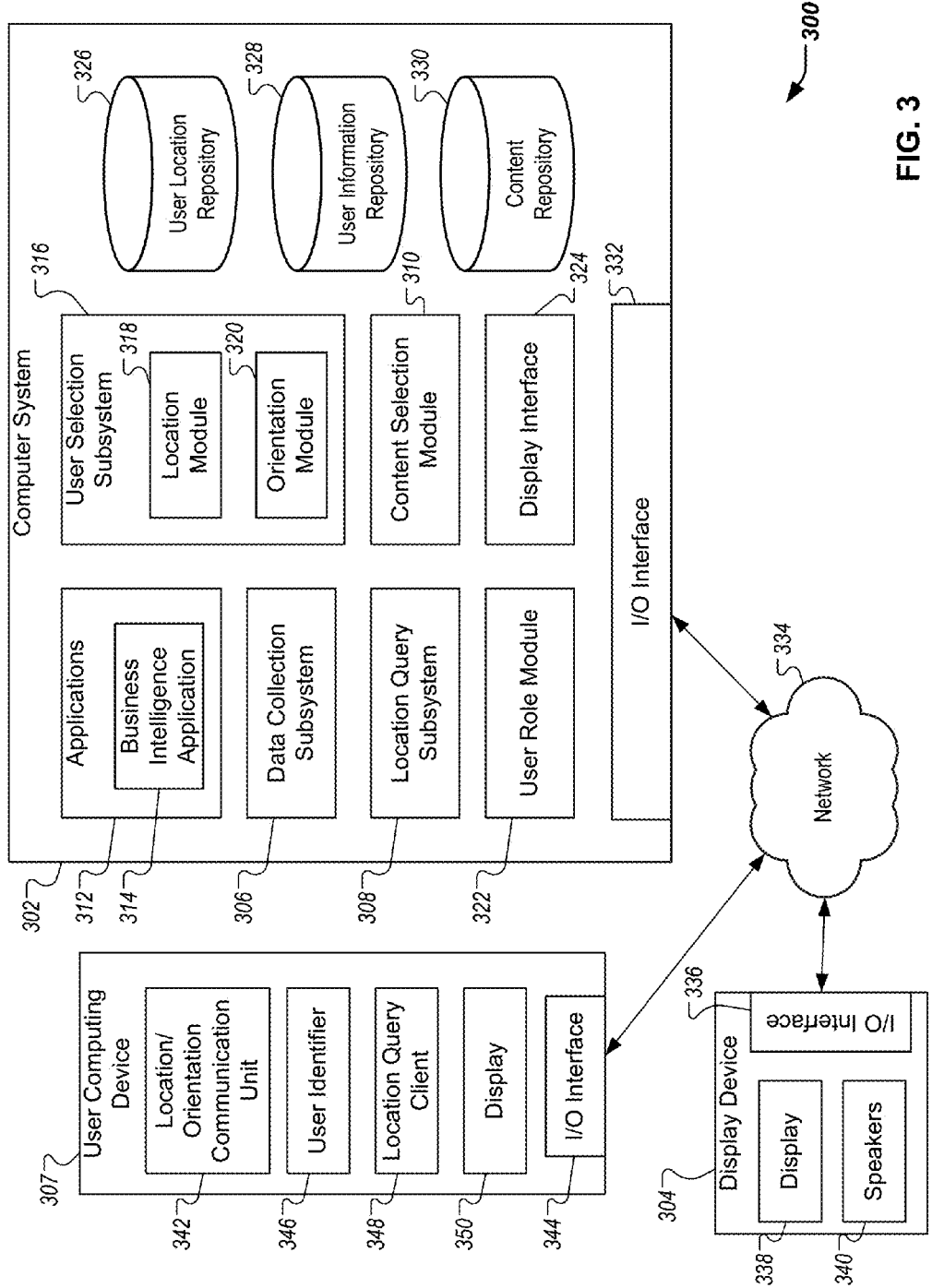

SELECTING CONTENT FOR PRESENTATION

TECHNICAL FIELD

This document generally describes computer-based selection of content for presentation on one or more displays.

BACKGROUND

Computer systems (e.g., desktop computers, laptop computers, mobile computing devices, media computing devices, embedded computer systems) have been configured to provide content to display devices (e.g., computer monitors, televisions, projectors) for the display devices to display. Such computer systems have been configured to select and provide content to display devices for presentation based on user input. For example, a user of a media computing device may cause a movie to be played on a projector that receives video input signals from the media computing device in response to a user selecting the movie through a user interface of the media computing device. In another example, a user of a computing device may cause a slideshow presentation to be repeatedly played on television based on the user selecting continuous playback of the slideshow in a user interface provided by the computing device.

SUMMARY

In one implementation, a computer-implemented method includes identifying, at a computer system, a plurality of users who are located within a threshold distance of a display device; selecting, by the computer system, a subset of the plurality of users based, at least in part, on location information that indicates current locations of the plurality of users relative to a location of the display device; identifying, by the computer system, roles within one or more organizations of individual users within the subset of the plurality of users; selecting content to present on the display device based, at least in part, on identities of the individual users within the subset of the plurality of users and the roles of the individual users within the subset of the plurality of users; and causing, by the computer system, the selected content to be presented on the display device.

This and other implementations can optionally include one or more of the following features. The display device can be a display device that is mounted to a wall. The display device can be located in a room or area that is used for one or more tasks and the content can be selected further based on the one or more tasks that are performed at the room or area. Selecting the content can include selecting business intelligence content that relates to the one or more tasks that are performed in the room or area and that is relevant to the roles of the subset of the plurality of users in the one or more organizations. Selecting the subset of the plurality of users can include selecting one or more users determined to be located in front of the display device such that the one or more users are likely able to view media output by the display device.

The computer-implemented method can further include obtaining the location information by communicating with a plurality of mobile computing devices that are associated with the plurality of users. Communicating with a plurality of mobile computing devices that are associated with the plurality of users can include: receiving, at the computer system, requests from the plurality of mobile computing devices for content that is relevant to the current locations of the plurality of users, where the requests can identify the current locations of the plurality of users and can include user identifiers that identify the plurality of users associated with the plurality of mobile computing devices; and providing, to the plurality of mobile computing devices, the content that is relevant to the current locations of the plurality of users; the method can further include: storing, by the computer system, information from the requests that associates the user identifiers with the current locations as the location information; and retrieving, by the computer system at a later time, the location information to use for selecting the content to present on the display device. Communicating with a plurality of mobile computing devices that are associated with the plurality of users can include receiving, at the computer system and from a wireless transceiver that is located near the display device, responses from the plurality of mobile computing devices to a wireless signal that is transmitted by the wireless transceiver, where the responses from the plurality of mobile computing devices to the wireless signal can indicate that the plurality of mobile computing devices are within range of the wireless signal and are located near the display device. Communicating with a plurality of mobile computing devices that are associated with the plurality of users can include periodically receiving, at the computer system, updated location information from the mobile computing devices; the method can further include: storing, by the computer system, the updated location information as the location information; and retrieving, by the computer system at a later time, the location information to use for selecting the content to present on the display device.

Selecting the subset of the plurality of users can include selecting the subset of the plurality of users based on orientation information that can indicate directions that the plurality of users are currently facing. Selecting the subset of the plurality of users can include selecting one or more users determined to be located in front and facing the display device such that the one or more users are likely able to view media output by the display device. The location information can include one or more of: global positioning system (GPS) data, identities of nearby wireless networks, and information that identifies nearby wireless computing devices.

In another implementation, a system includes: a display device; one or more computing devices that control media that is output by the display device; a user selection subsystem that is installed on the one or more computing devices and that is programmed to identify a plurality of users who are located within a threshold distance of a the display device, and to select a subset of the plurality of users based, at least in part, on location information that indicates current locations of the plurality of users with regard to a location of the display device; a user roles module that is installed on the one or more computing devices and that is programmed to identify roles of the subset of the plurality of users in one or more organizations; a content selection module that is installed on the one or more computing devices and that is programmed to select content to present on the display device based, at least in part, on identities of users within the subset of the plurality of users and the roles of the subset of the plurality of users; and a display interface that is programmed to cause the selected content to be presented on the display device.

This and other implementations can optionally include one or more of the following features. The display device can be a display that is mounted to a wall. The display device can be located in a room or area that is used for one or more tasks; and the content can be selected further based on the one or more tasks that are performed at the room or area. The selected content can include business intelligence content that relates to the one or more tasks that are performed in the room or area and that is relevant to the roles of the subset of the plurality of users in the one or more organizations.

In another implementation, a computer program product embodied in a computer-readable storage device storing instructions that, when executed, cause one or more computer processors to perform operations including: identifying a plurality of users who are located within a threshold distance of a display device; selecting a subset of the plurality of users based, at least in part, on location information that indicates current locations of the plurality of users with regard to a location of the display device; identifying roles of the subset of the plurality of users in one or more organizations; selecting content to present on the display device based, at least in part, on identities of users within the subset of the plurality of users and the roles of the subset of the plurality of users; and causing the selected content to be presented on the display device.

This and other implementations can optionally include one or more of the following features. The display device can be a display device that is mounted to a wall. The display device can be located in a room or area that is used for one or more tasks; and the content can be selected further based on the one or more tasks that are performed at the room or area. Selecting the content can include selecting business intelligence content that relates to the one or more tasks that are performed in the room or area and that is relevant to the roles of the subset of the plurality of users in the one or more organizations.

The details of one or more implementations are set forth in the accompanying drawings and the description below.

DESCRIPTION OF DRAWINGS

FIG. 3 is a block diagram of an example system that includes a computer system that selects and provides content for presentation on a display device.

DETAILED DESCRIPTION

This document generally describes computer selection of content to output on display devices based on contexts surrounding the display devices. Display devices can be any of a variety of devices that visually output content, such as televisions, computer monitors, and/or projectors or the like. Display devices can be communal displays (e.g., a television mounted to a wall) and/or personal displays (e.g., a touchscreen on a smartphone or tablet computer, a laptop display, etc.). Contexts surrounding display devices can include a variety of appropriate details regarding an environment within which a display device is located, such as activities that are being performed around the display device (e.g., manufacturing activities) and/or users who are located near and likely able to view the display device. Content that is selected can include any of a variety of different types of content, such as text, graphics, photos, videos, audio, or any combination thereof. For example, content that is selected can be business intelligence (BI) data (e.g., real-time data indicating various aspects of a business's performance) that is relevant to a location where a display device is located (e.g., manufacturing facility, business headquarters, etc.) and to users who are currently located nearby the display device.

For example, if a big screen television (example display device) is mounted to the wall of a manufacturing facility and it is determined that a manager of the facility and several assembly workers are likely to be viewing the television (e.g., the manager and workers are determined to be standing near the television), a computer system that manages content output by the television can automatically select content that is relevant to the activity surrounding the television (manufacturing) and that is relevant to viewers (manager and workers). For instance, a BI report can be generated by the computer system that includes information detailing the current day's manufacturing production as compared to historical manufacturing production for the facility—information that can help both the manager and the workers know whether the facility is on track for the day.

Figure 1:
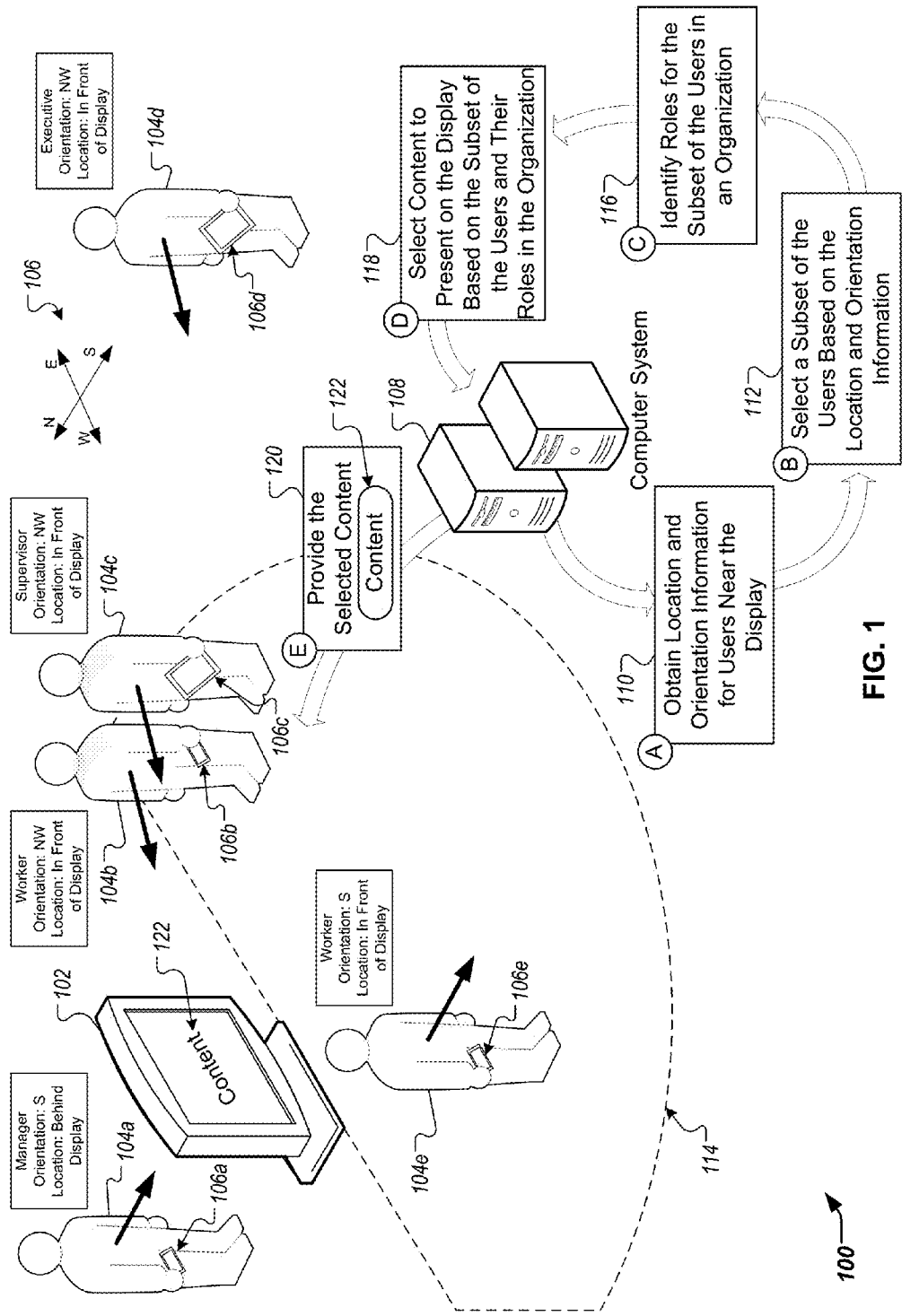
FIG. 1 is a conceptual diagram of an example system for automatically selecting content to present on a display device.

FIG. 1 is a conceptual diagram of an example system 100 for automatically selecting content to present on a display device 102. The display device 102 is depicted as being a large screen television/computer monitor, but can be any of a variety of display devices. For example, the display device 102 can be a display that is mounted to the wall of a building, such as a wall of an office or warehouse. Content can be selected for presentation on the display device 102 based, at least in part, on users who are likely able to view content that is output by the display device 102, roles for these users within one or more organizations (e.g., manager, executive, assistant, factory worker, visitor, etc.), one or more tasks that are performed in an area where the display device 102 is located (e.g., manufacturing tasks are performed near a display device that is mounted to a wall in a manufacturing facility), and/or other information associated with the users who are determined to be likely to be able to view the display device 102 (e.g., languages spoken by the users) or with an organization with which the display device 102 is associated (e.g., announcements/news for the organization).

As illustrated in FIG. 1, five example users 104*a-e* are positioned at various locations and orientations around the display device 102. For example, a first user 104*a* is located behind the display device 102 and has a southern orientation, according to the compass rose 106 and as indicated by the arrow protruding from the user 104*a*, such that the user 104*a* is facing the back of the display device 102. The second user 104*b* is located in front of and to the right of the display device 102 and has an northwestern orientation, as indicated by the arrow protruding from the user 104*b*, such that the user 104*b* is facing the front of the display device 102. The third user 104*c* is located to the side of the second user 104*b* and has the same northwestern orientation as the second user 104*b*. The fourth user 104*d* is located to the right of the display device 102 but is further away from the display device 102 than the second and third users 104*b* and 104*c*. The fourth user 104*d* also has a northwestern orientation, as indicated by the arrow protruding from the user 104*d*, such that the user 104*d* is facing the front of the display device 102. The fifth user 104*e* is located in front of and to the left of the display device 102 and has a southern orientation such that the user 104e is facing away from the display device 102.

The users 104a-e are depicted as holding or otherwise being physically associated with (e.g., carrying in a pocket/bag) mobile computing devices 106a-e, such as smartphones, tablet computing devices, cell phones, personal digital assistants (PDAs), and/or other mobile computing devices. Information indicating the locations and orientations of the users 104a-e relative to the location of the display device 102 can be obtained using the mobile computing devices 106a-e.

An example computer system 108 depicted in FIG. 1 automatically selects content to output on the display device 102 based on the current context surrounding the display device 102, such as the subset of the users 104a-e who are likely able to view content output by the display device 102, roles of the users 104a-e within one or more organizations, activities that are performed in an area around the display device 102, and/or other information associated with the users 104a-e, a building/facility where the display device 102 is located, and/or one or more organizations that are associated with the display device 102. The computer system 108 can be any of a variety of computing systems, such as, for example, one or more desktop computers, laptop computers, computer servers, media computing devices, video game systems, embedded computing devices, or any combination thereof. Although the computer system 108 is depicted as being separate from the display device 102, the computer system 108 may be an embedded computer system that is part of the display device 102. The computer system 108 can be physically proximate to the display device 102 (e.g., located in the same room or facility as the display device 102, connected to the same local area network (LAN)) and/or can be at a remote location (e.g., remote server system accessible over the internet or a wide area network (WAN)).

As indicated by step A (110), the computer system 108 obtains location and orientation information for the users 104a-e who are located near the display device 102. Location information can include any of a variety of information that indicates the locations of the mobile computing devices 106a-e, such as global positioning system (GPS) data, address information (e.g., physical address, IP address), information that identifies received wireless beacon signals for nearby wireless networks (e.g., signals from one or more Wi-Fi transceivers, signals from one or more cellular network towers, signals from one or more 3G/4G data network transceivers), and/or detected signal strength for such wireless beacon signals. Orientation information can include any of a variety of information that indicates the current orientation of the mobile computing devices 106a-e, such as information that identifies cardinal directions (e.g., north, south, east, west) and/or degrees of orientation relative to a particular direction (e.g., 90 degrees from north). The computer system 108 can obtain location and orientation information from the mobile computing devices 106a-e that are associated with the users 104a-e using any of a variety of techniques, such as those described below with regard to FIGS. 2A-C. In addition to obtaining location and orientation information, the computer system 108 may also obtain information that identifies users associated with the mobile computing devices 106a-e, such as a unique user identifier for each of the users 104a-e.

Using the obtained location information and/or orientation information, the computer system 108 can select a subset of the users 104a-e who are likely able to view content displayed by the display device 102, as indicated by step B (112). Users who are likely able to view the content displayed on the display device 102 can include users who are located within a threshold distance of the display device 102, who are located in front of the display device 102, and who are facing the display device 102. In the depicted example, the computer system 108 can use the obtained location information to determine that the users 104b, 104c, and 104e are located within an example defined area 114 that is in front of the display 102 and that is perceived as being close enough to the display device 102 that users within area 114 would be able to accurately view any content that is displayed. The area 114 can be bounded by a threshold distance that is based, at least in part, on the size of the display device 102 (e.g., diagonal measurement of the screen's size, resolution of the display device 102, etc.) and/or the size with which content is displayed on the display device 102 (e.g., text is displayed with 48 point font). As such, in some implementations, the boundaries of area 114 may change depending on content to be displayed on the display device 102.

The computer system 108 can use the orientation information to further refine the subset of the users by removing users who are likely facing away from the display device 102, as indicated by the orientation information obtained from the mobile computing devices 106a-e associated with users 104a-104e, respectively. For example, the computer system 108 can remove the user 104e from the subset of users based on the user 104e facing away from the display device 102, while keeping the users 104b and 104c in the subset of users based on the orientation information from the mobile computing devices 106b and 106c, respectively, indicating that the users 104b and 104c are facing the display device 102.

The computer system 108 can identify users who are likely facing the display device 102 in a variety of ways. For example, the computer system 108 can access information that identifies a location of the display device 102, a direction that the display device 102 is facing, and/or a viewing angle for the display device 102 (e.g., 150 degree viewing angle). The computer system 108 can compare such information for the display device 102 with the location and orientation information for the users 104a-104e to identify which of the users are likely able to view content presented on the display device 102.

For instance, in the example depicted in FIG. 1 the display device 102 is generally facing south such that content is presented to users who are generally located south of the display device 102. The orientation of the users who are identified as being located within the area 114, which includes users 104b, 104c, and 104e, can be compared to the direction of the display device 102. For instance, users who have an orientation that is generally opposite the direction of the display device 102 can be determined to be likely facing the display device, such as the users 104b and 104c who have a generally northern orientation (NW orientation for both users) when compared to the southern display direction of the display device 102. In contrast, the user 104e can be determined to not be likely facing the display device 102 based on the user 104e having an orientation (south) that is generally the same as the southern display direction of display device 102.

Varying levels of precision can be used for comparing user orientation with display direction so as to determine whether users are facing the display device 102. For instance, the orientation information of the users, which can be derived from their mobile computing devices, may be determined to be an imprecise indicator of a user's actual orientation and, as a result, more general comparisons of the display direction and the orientation information can be made and used, as described in the previous example. In other implementations, the location of the users relative to the location of the display device 102 and the viewing angle (e.g., 175 degree viewing angle) of the display device 102 can be taken into account. For instance, user's located in front of (south of) and to the right (east) of the display device 102 may only be determined to be likely viewing the display device 102 if they have a northwesterly orientation and if the users are not located so far north as to be outside of the viewing angle for the display device 102.

The computer system 108 can identify roles within one or more organizations (e.g., businesses, schools, etc.) for users within the subset of users, as indicated by step C (116). The computer system 108 can use information that identifies the subset of users, such as user identifiers that were provided by the mobile computing devices 106a-e, to query a repository of user information that includes, among other things, information describing roles that the users 104a-e have in one or more organizations. As depicted in FIG. 1, example roles are provided for the users 104a-e within an organization as executive (user 104d), manager (user 104a), supervisor (user 104c), and worker (users 104b and 104e). Although responsibilities and tasks associated with roles can vary among organizations, an executive can have organization-wide responsibilities, a manager may be responsible for managing a portion of an organization (e.g., managing a department of a business, managing a facility that is part of the organization) and may report to one or more executives, a supervisor may be responsible for directly supervising the work of one or more workers (e.g., a floor supervisor monitoring tasks performed by workers in a manufacturing facility that is managed by a manager) and may report to one or more managers, and a worker can directly perform tasks (e.g., producing goods, providing services to clients) and can report to one or more supervisors, The number of roles that users can have and the detail with which they are provided can vary depending on the organization to which they apply. In some implementations, roles can include job titles.

Roles can be used by the computer system 108 to select content that is perceived as likely being relevant to each of the users in the subset of the users, as indicated by step D (118). By identifying content that is relevant to each user who is likely to be viewing the display device 102, the computer system 108 can maximize the effectiveness of information that is presented on the display device 102 by appealing to a broader audience. For instance, the example subset of users includes the user 104b who has the role of worker and the user 104c who has the role of supervisor. The computer system 108 can identify content to present on the display device 102 that is relevant to a worker (user 104b) and to a supervisor (user 104c). For example, content that is determined by the computer system 108 to be likely be relevant to user 104b (worker) and user 104c (supervisor) can include content related one or more current productivity metrics (e.g., current volume of production versus productivity quotas, current sales figures versus historical sales figures) for tasks to be performed by the user 104b (and possibly other workers) and to be supervised by the user 104c, a prioritized list of action items to be completed by the user 104b (and possibly other workers) and supervised by the user 104c, and/or an updated schedule (e.g., list of calendar appointments, task assignments throughout the day) for the user 104b and the user 104c.

The content can be any of a variety of content, such as business intelligence information (e.g., reports, real-time business data, graphs, charts), news (e.g., news regarding the organization, industry-wide news, local news, national news, international news), instructional information (e.g., instructional videos), schedule information (e.g., upcoming events for the subset of users, upcoming organization events), correspondence (e.g., messages/memos applicable to the subset of users), financial information (e.g., stock market data, exchange rates), and/or other types of information. Business intelligence (BI) information can include a variety of information, such as data visualizations of metrics that are relevant to a business and/or key performance indicators that are relevant to a business. Content that is selected for presentation on the display device 102 can include multiple visualizations of metrics and/or key performance indicators, and can be presented as part of a dashboard that provides multiple concurrent views of different metric visualizations and/or key performance indicators. For example, the display device 102 can present a dashboard that includes a first visualization of a metric and a second visualization of a metric.

The relevance of content to the subset of the users can be determined in a variety of ways. For example, metadata can be used to identify particular portions of an organization (e.g., roles in the organization, departments of the organization, particular users in the organization, etc.) to which content is relevant. For instance, a schedule (example content) for workers at a manufacturing plant can be identified by metadata as being relevant to roles such as workers and supervisors, can be identified by metadata as being relevant to the manufacturing plant and to a manufacturing department more generally, and/or can be identified by metadata as being relevant to the workers who are listed on the schedule and to their direct supervisors.

Relevant content can be identified by querying the metadata using information that identifies the users included in the identified subset of users, the roles for the subset of the users, a location of the display device 102, and/or other attributes associated with the subset of the users (e.g., departments within which the subset of the users work, user preferences, etc.). Content that is determined to have associated metadata that satisfies at least a minimum number of the parameters set forth in such queries (e.g., content with metadata that at least identifies each of the roles for the subset of the users) can be identified as being relevant to the subset of the users. If no content is identified as being relevant (e.g., no content has associated metadata that identifies all of the roles for the subset of the users), a backoff technique can be used to iteratively remove parameters from the query (broaden the query) until content is identified. For instance, if a query includes the roles for the subset of the users and no metadata is found to include all of the roles, one or more roles can be removed from the query and the query can run again. This removal of roles from the query and the rerunning of the query can be continue in an iterative manner until content is located. Roles can be removed from a query in any of a variety of orders, such as a bottom-up manner (e.g., removing roles from lowest ranking roles to highest ranking roles), in a top-down manner (e.g., removing roles from the highest ranking roles to the lowest ranking roles), and/or through other customized ordering of roles.

The computer system 108 can additionally or alternatively select content based on one or more tasks that are being performed at or near the display device 102. For example, if the display device 102 is mounted to a wall of an area where orders are filled and shipped to customers and the users 104b and 104*c* are facing the display device 102 and within a threshold distance of the display device 102 (as discussed above), the computer system 108 can select content that is both related to the orders that are being filled and shipped in the area and relevant to the users 104*b* and 104*c*. For instance, the computer system 108 can select business intelligence information that is related to the activity in the area (order filling and shipping) and that is relevant to both workers (the example user 104*b*) and supervisors (the example user 104*c*), such as information listing outstanding orders awaiting fulfillment and statistics regarding order fulfillment (e.g., average time to fulfill an order, number of orders processed over a period of time, pending orders, comparison of current performance with historic performance, etc.).

The computer system 108 can provide the selected content 122 to the display device 102 for presentation, as indicated by step E (120). The content 122 can be provided to the display device 102 in any of a variety of ways, such as transmission over one or more networks (e.g., wireless network, LAN, WAN, internet) and/or through one or more wired connections (e.g., HDMI cable connection, bus connection, component video connection, etc.). The content 122 can be provided in any of a variety of ways, such as a discrete file and/or as streaming content.

The display device 102 can present the received content 122 from the computer system 108 by visually outputting at least a portion of the received content 122 on a display of the display device 102 and/or audibly outputting a least a portion of the content 122 using one or more audio speakers that are associated with the display device 102 (e.g., internal speakers, external speakers).

The computer system 108 can continuously monitor for changes in the context surrounding the display device 102 and/or the context surrounding other display devices to identify appropriate content to provide for presentation on the display device 102. For instance, if the user 104*d* moves closer to the display device 102 at a later time such that the user 104*d* is within the area 114, the computer system 108 can select different content that is relevant to users 104*b*-104*d* and/or to tasks performed in the area 114 for presentation on the display device 102. For example, if display device 102 is located in a retail store where the user 104*b* is a salesperson and the user 104*c* is a sales floor supervisor, the computer system 108 can identify content that is likely to be relevant to the salesperson and the floor supervisor for the retail store using a query that identifies the users 104*b* and 104*c*, their roles (salesperson and floor supervisor), and the location of the display device 102 (located in a particular retail store). For instance, such a query can result in current sales performance and inventory information for a department of the retail store in which the salesperson works as being identified as likely to be relevant to both the salesperson (user 104*b*) and the floor supervisor (user 104*c*). When the executive (user 104*d*) approaches the display device 102 and is determined by the computer system 108 to likely be viewing the display device 102, the computer system 108 can modify the query to additionally include information that identifies the user 104*d* and his/her role as executive. Such a modified query can be used to present additional and/or different content on the display device 102 that is relevant to the salesperson (user 104*b*), the floor supervisor (user 104*c*), and the executive (user 104*d*), such as information that compares the current sales performance of the department of the retail store in which the user 104*b* works to the current sales performance of similar departments in other retail stores within the organization. The inclusion of users in a query who are higher-up in an organization's hierarchy may cause the computer system 108 to identify and present content on the display device 102 that presents more of a macro view of the organization than without such users being included in the query.

In a contrasting example, if the user 104*c* is the only user determined to be viewing the display device 102 and the user 104*c* is a floor supervisor in a retail store, the computer system 108 can identify content that is relevant to the user 104*c*, such as current sales and inventory information for the entire retail store. If the user 104*b* (salesperson) approaches the display device 102 and is determined by the computer system 108 to likely be viewing the display device 102, the computer system 108 can filter the content and/or modify a query that is being used to identify relevant content. For instance, the content presented on the display device 102 may be changed from store-wide sales and inventory information to sales and inventory information for the particular department within which the user 104*b* works.

In some implementations, the computer system 108 can select content that is relevant to particular individual users and/or to particular user roles and can cause the selected content to be presented by the display device 102 in one or more separate portions of the display area. For instance, a portion of the display 102 can be reserved to display content that is relevant to the user 104*b* (the content may not be relevant to other users and/or users with other roles) and another portion of the display 102 can be reserved to display other content that is relevant to the user 104*c*. For example, a list of messages and reminders for the user 104*b* (example content that is relevant to the user 104*b*) can be presented in a first area of the display 102 and upcoming appointments for the user 104*c* (example content that is relevant to the user 104*c*) can be presented in a different, second area of the display 102. Such individual content can be presented on the display 102 with or without content that is determined to be communally relevant to users who are likely viewing the display device 102.

Figure 2A:
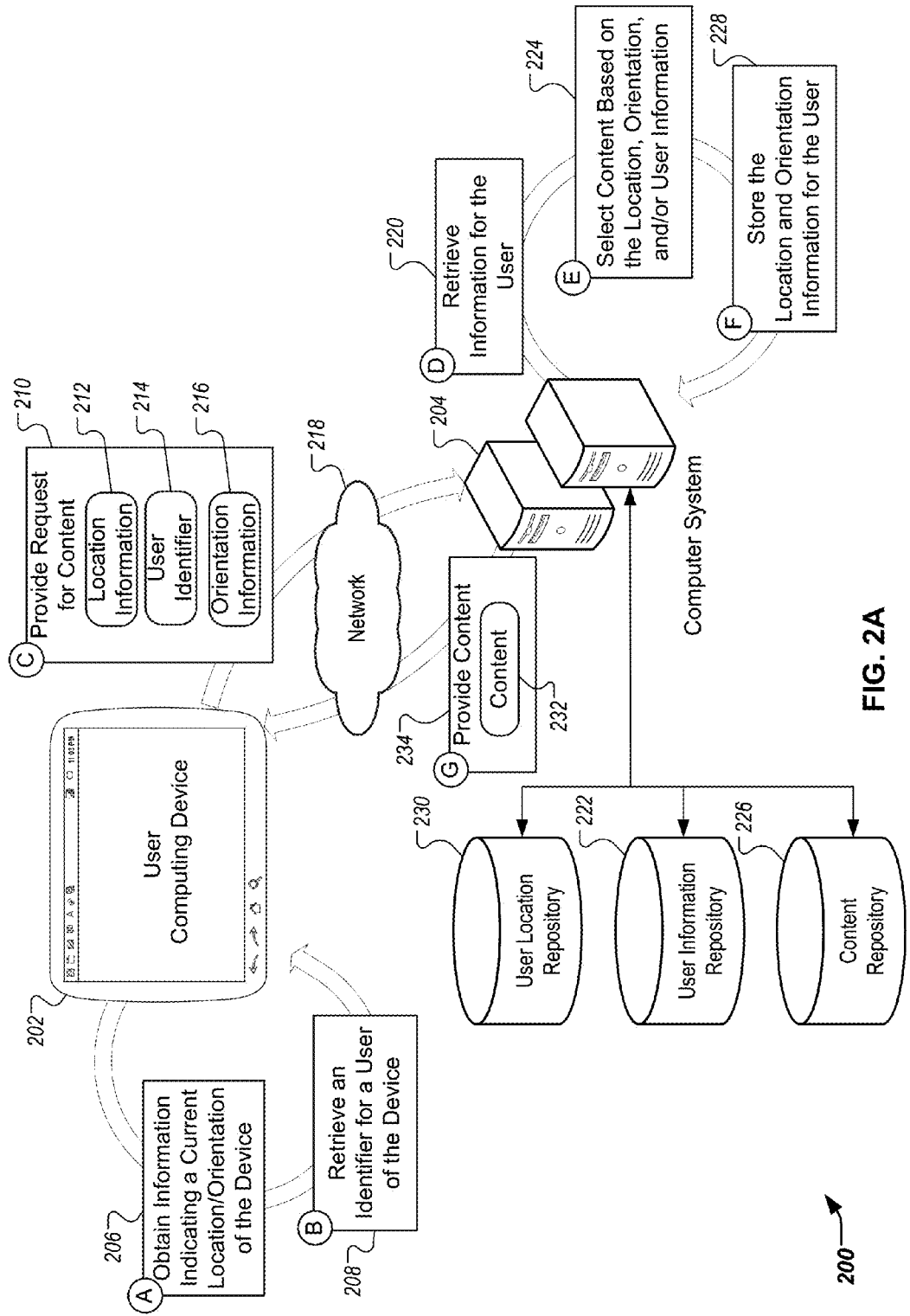
FIGS. 2A-C are conceptual diagrams of example systems for obtaining location and/or orientation information for users.
Figure 2B:
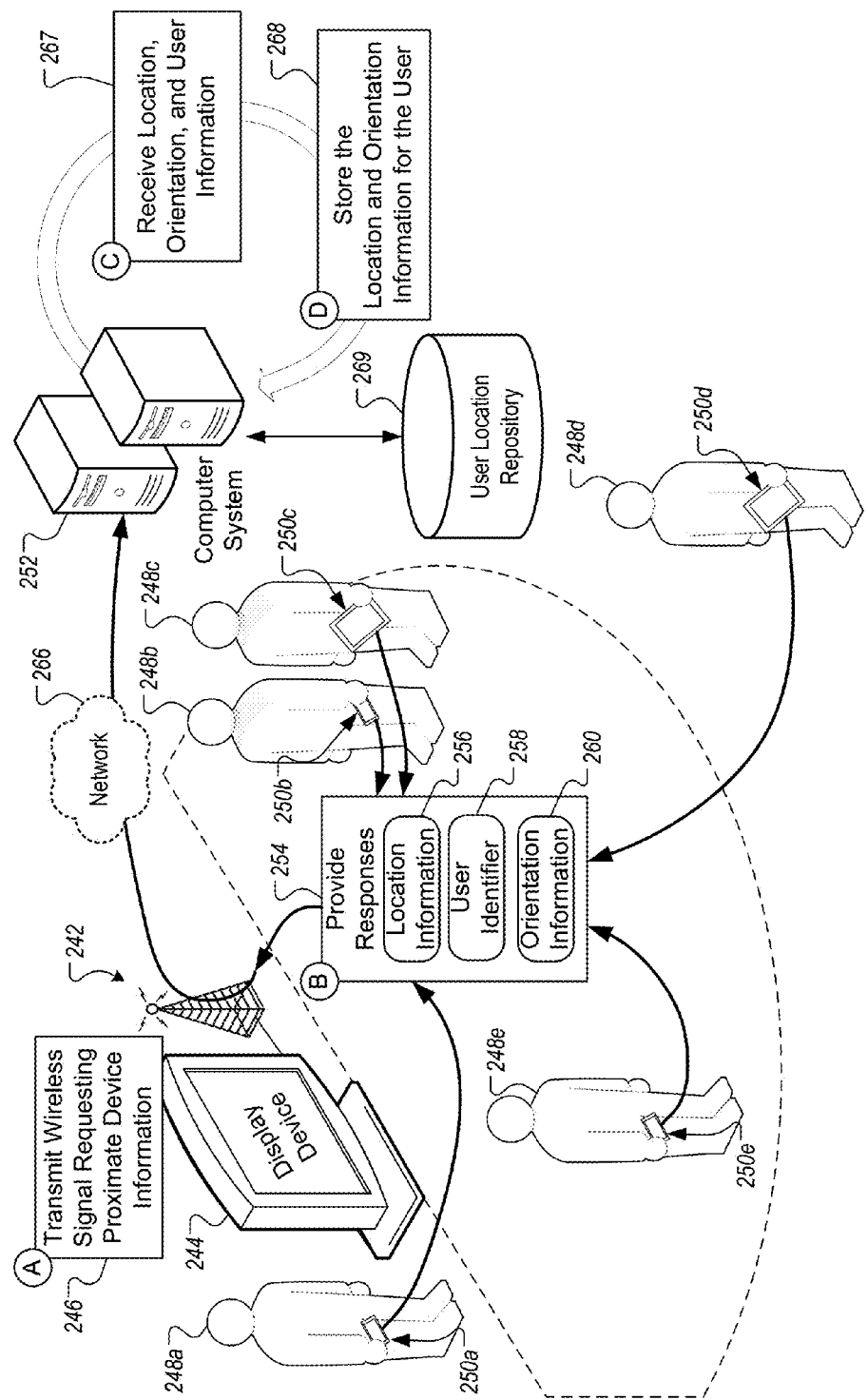
Figure 2C:
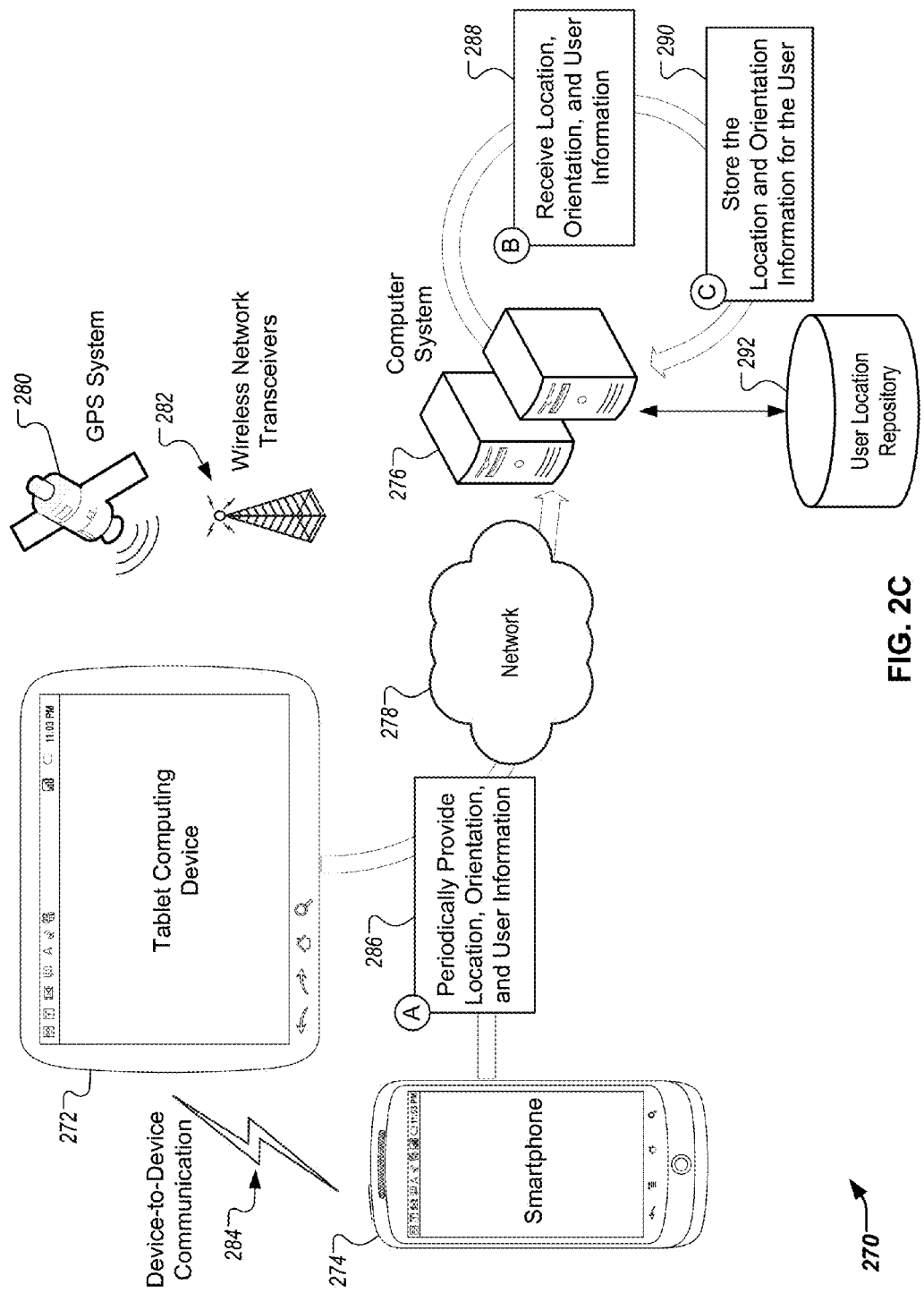

FIGS. 2A-C are conceptual diagrams of example systems for obtaining location and/or orientation information for users. FIG. 2A is a conceptual diagram of an example system 200 in which location and/or orientation information are obtained for a user computing device 202 based on requests made by the user computing device 202 for location-based content to a computer system 204. FIG. 2B is a conceptual diagram of an example system 240 in which a wireless transceiver 242 that is associated with a display device 244 requests nearby user computing devices to indicate their presence near the display device 244. FIG. 2C is a conceptual diagram of an example system 270 in which user computing devices 272 and 274 periodically provide location and/or orientation information to a computer system 276 over one or more networks 278. The systems 200, 240, and 270 can be used alone and/or in combination, in whole or in part, to obtain location and/or orientation information for user computing devices. Other systems not explicitly described can also be used to obtain location and/or orientation information for user computing devices.

Referring first to FIG. 2A, the user computing device 202 can be any of a variety of user computing devices, such as, for example, a mobile computing device (e.g., a smartphone, a tablet computing device, a PDA, etc.). The user computing device 202 can be configured to provide location-based queries to the computer system 204 for content that is relevant to a user and to a location where the user computing device 202 is currently located. For example, if the user computing device 202 is brought into a warehouse by a user, the user computing device 202 can provide an updated query to the computer system 204 for content related to the warehouse that is likely to be relevant to the user. Content that is likely relevant to a user can be determined by the computer system 204 based on any of a variety of factors, such as a role of the user in one or more organizations, personal preferences that the user has expressed, and/or other users who are located nearby the user of the user computing device 202.

As indicated by step A (206), the user computing device 202 obtains information indicating a current location and/or orientation of the user computing device 202. The user computing device 202 can obtain such location information using any of a variety of techniques, such as using a GPS unit that is installed on the user computing device 202 to obtain current GPS coordinates for the user device 202, requesting location information from a remote system that is capable of triangulating the location of the user computing device 202 through detected signal strength (e.g., cellular telephone triangulation), through user input identifying a current location of the user computing device 202 (e.g., the user types and/or speaks the current address at which the user computing device 202 is located), through location identification based on the presence of one or more wireless beacon signals and/or other computing devices, and/or based on a network address assigned to the user computing device 202. Similarly, the user computing device 202 can obtain orientation information using any of a variety of techniques, such as using a digital compass (e.g., a magnetometer) that is installed on the user computing device 202 to identify a current orientation (e.g., cardinal direction orientation or degrees from a particular direction) of the user computing device 202.

The user computing device 202 can additionally retrieve an identifier for a user of the device 202, as indicated by step B (208). Such an identifier can be information that uniquely identifies the user of the current user computing device 202, such as a unique numeric identifier, a telephone number, an email address, a social network identifier, a username, and/or an employee identifier. This user identifier can be stored by the user computing device 202 in association with additional user information that may be retrieved, such as information that identifies a role of the user in one or more organizations.

The user computing device 202 can provide a request for content to the computer system 204, as indicated by step C (210). The request can include location information 212 for the user computing device 202, a user identifier 214 for a user of the user computing device 202, and/or orientation information 216 for the user computing device 202. The request can be transmitted by the user computing device 202 to the computer system 204 over one or more networks 218 (e.g., mobile data networks such as 3G/4G networks, a cellular network, a Wi-Fi network, the internet, a LAN, a WAN, or any combination thereof). The user computing device 202 can provide requests to the computer system 204 at various intervals that are defined by time and/or location. For example, the user computing device 202 may provide a request to the computer system 204 every minute, two minutes, five minutes, 15 minutes, 20 minutes, hour, etc. In another example, the user computing device 202 may provide a request to the computer system 204 when the user computing device 202 has traveled at least a threshold distance (e.g., 10 yards, 50 yards, 100 yards, 0.1 miles, 0.25 miles, 1.0 miles, 10 miles) and/or when the user computing device 202 has been moved to a different physical structure (e.g., room, building, automobile).

In response to receiving the request, the computer system 204 can retrieve information for the user of the user computing device 202, as indicated by step D (220). The computer system 204 can use the user identifier 214 that was included in the request from the user computing device 202 to query a user information repository 222 that stores information associated with users, such as roles within one or more organizations, preferences with regard to types of content to be displayed on user computing devices, and/or previous interaction with content that was previously provided to the user computing device 202 (e.g., viewed the content for at least a threshold period of time, only viewed the first page of the content, did not view the content, etc.).

The computer system 204 selects content to provide to the user computing device 202 based on the obtained user information, the location information 212, and/or the orientation information 216, as indicated by step E (224). The content can be selected from a content repository 226, which can store various types of content, such as business intelligence information and/or news. In some implementations, the content is additionally selected based on whether the user computing device 202 is determined to be located near a display device, such as display device 102, for which the computer system 204 is providing content. In such implementations, the computer system 204 can select particular content that is the same as, that is similar to, that annotates, and/or that allows the user computing device 202 to interact with the content that the corresponding display device is presenting.

The computer system 204 can additionally store the location and/or orientation information for the user computing device 202 and/or its user, as indicated by step F (228). The location and/or orientation information can be temporarily stored by the computer system 204 in a user location repository 230. Information stored in the user location repository 230 can be queried by the computer system 108 (which can be similar to and/or the same as the computer system 204) to obtain location and/or orientation information for users who are located near the display device, as indicated by step A (110) of FIG. 1. The location and orientation information can be temporarily stored until more recent location and orientation information has been obtained for computing device 202 or until a timer associated with the location and orientation information has expired. For instance, given that users move around and change the direction they are viewing with a fair amount of frequency, the location and orientation information may only be reliable for a brief period time (e.g., 5 minutes, 10 minutes, 20 minutes, 30 minutes, 45 minutes, 1 hour, 4 hours), so a timer can be used to determine when to discard location and orientation information when stored location and orientation information has not been replaced with more current location and orientation information.

The computer system 204 can provide the selected content 232 over the one or more networks 218 to the user computing device 202 for presentation to the user, as indicated by step G (234).

For example, the content that is selected by the computer system 204 for presentation to a particular user on the user computing device 202 can be different depending on the current location of the device 202. For instance, if the user computing device 202 is being used by a particular user in a first area of a facility where a first product is manufactured, the computer system 204 can select and provide to the device 202 content that relates to the first product (e.g., current sales of the first product, pending orders for the first product, profit margin for first product) and/or to the first area (e.g., current rate of production of the first product in the first area). In contrast, if the user computing device 202 is being used by the same particular user in a different second area of the facility where a second product is manufactured, the computer system 204 can select and provide different content to the device 202 that relates to the second product and/or to the second area.

In another example, the content that is selected by the computer system 204 for presentation on user computing devices at the same location can be different depending on which users are associated with the user computing devices. For instance, an executive and a sales person in an organization can both be located at a retail store for the organization and can both have user computing devices, similar to the user computing device 202, yet the content that is selected for presentation to the executive by the computer system 204 can be different than the content selected for presentation to the sales person. For instance, the computer system 204 may select content for presentation on the executive's computing device that relates to sales and inventory information for the particular retail store as well as for other comparable retail stores within the organization. In contrast, the computer system 204 can select different content for presentation on the sales person's computing device that relates to current sales information for the sales person and for the department of the particular retail store within which the sales person works.

Referring now to FIG. 2B, user location and/or orientation information is obtained by the system 252 with the use of a wireless transceiver 242 that is physically located near the display device 244 and which requests user computing devices that are located nearby to identify themselves and, in some implementations, to provide additional location information (above the indication that the user computing device is located near the transceiver 242 and the display device 244).

As indicated by step A (246), the wireless transceiver 242 transmits a wireless signal requesting that proximate devices provide identifying and/or location information in response. The wireless transceiver 242 can use any of a variety of wireless transmission standards to provide the signal, such as IEEE 802.11n, IEEE 802.11g, and/or IEEE 802.11b. The wireless transceiver 242 can be physically located near the display device 244 such that responses received from user computing devices by the wireless transceiver 242 indicate that the user computing devices are physically located near the display device 244.

Example users 248a-e with example user computing devices 250a-e are depicted as being located around the display device 244 and the wireless transceiver 242. In response to receiving the signal transmitted by the wireless transceiver 242, the user computing devices 250a-e can provide responses that are received by the wireless transceiver 242 and provided to a computer system 252, as indicated by step B (254). The responses by the user computing devices 250a-e can include any of a variety of information, such as information that identifies the user computing devices 250a-e, additional location information 256 (e.g., GPS coordinates for the user computing devices 250a-e), user identifiers 258 (e.g., unique identifiers for the users 248a-e), and/or orientation information 260 (e.g., information identifying a direction that the user computing devices 250a-e are facing). The wireless transceiver 242 may provide the received responses to the computer system 252 using one or more available networks 266, such as the internet, a LAN, a WAN, and/or a wireless network. By having the computing devices 250a-e identify themselves to the wireless transceiver 242, devices that are physically located near the display device 244 can be identified.

The computer system 252 can receive the location, orientation, and/or user information from the responses, as indicated by step C (267), and the computer system 252 can proceed to store the location and/or orientation information in association with the users 248a-e and/or in association with the user computing devices 250a-e, as indicated by step D (268). The location and/or orientation information can be stored in a user location repository 269 that can be similar to the user location repository 230 described above with regard to FIG. 2A. Information stored in the user location repository 269 can be queried by the computer system 108 (which can be similar to and/or the same as the computer system 252) to obtain location and/or orientation information for users who are located near the display device, as indicated by step A (110) of FIG. 1. The location and orientation information can be temporarily stored until more recent location and orientation information has been obtained for computing device 202 or until a timer associated with the location and orientation information has expired. For instance, given that users move around and change the direction they are viewing with a fair amount of frequency, the location and orientation information may only be reliable for a brief period time (e.g., 5 minutes, 10 minutes, 20 minutes, 30 minutes, 45 minutes, 1 hour, 4 hours), so a timer can be used to determine when to discard location and orientation information when stored location and orientation information has not been replaced with more current location and orientation information.

Referring next to FIG. 2C, the example system 270 includes user computing devices 272 and 274 which are configured to periodically provide information that identifies their locations and/or orientations to the computer system 276 over one or more networks 278.

The user computing devices 272 and 274 can determine their location information using any of a variety of techniques, such as through external signals from GPS satellites that are part of a GPS system 280 and/or through one or more wireless network transceivers 282 (e.g., 3G/4G data network transceivers, cellular network transceivers, Wi-Fi network transceivers, Bluetooth network transceivers, wireless beacons, etc.). The user computing devices 272 and 274 can additionally determine their location information based on device-to-device communication 284, such as near field communication between the device 272 and the device 274, wired communication between the devices 272 and 274 (e.g., data tethering connection between the devices 272 and 274), and/or other wireless communication between the devices 272 and 274 (e.g., communication over one or more Wi-Fi data transmission standards). Location information can include information that identifies a devices location relative to the earth (e.g., GPS coordinates, mailing address), relative to a physical structure (e.g., signal strength relative to the location of a wireless transceiver), and/or relative to other devices (e.g., physical proximity to another computing device). Other types of location information are also possible.

The user computing devices 272 and 274 can also determine their location information using one or more other techniques, such as using one or more digital compasses that are installed on the user computing devices 272 and 274.

The user computing devices 272 and 274 can be configured to periodically provide location information and/or orientation information in association with information that identifies a current user of the user computing devices 272 and 274, as indicated by step A (286). Such information can be provided over the one or more networks 278 to the computer system 276.

The computer system 276 can receive the location, orientation, and/or user information from the responses, as indicated by step B (288), and the computer system 276 can proceed to store the location and/or orientation information in association with the users of the user computing devices 272 and 274, as indicated by step D (290). The location and/or orientation information can be stored in a user location repository 292 that can be similar to the user location repository 230 described above with regard to FIG. 2A. Information stored in the user location repository 292 can be queried by the computer system 276 (which can be similar to and/or the same as the computer system 108) to obtain location and/or orientation information for users who are located near the display device, as indicated by step A (110) of FIG. 1. The location and orientation information can be temporarily stored until more recent location and orientation information has been obtained for computing device 202 or until a timer associated with the location and orientation information has expired. For instance, given that users move around and change the direction they are viewing with a fair amount of frequency, the location and orientation information may only be reliable for a brief period time (e.g., 5 minutes, 10 minutes, 20 minutes, 30 minutes, 45 minutes, 1 hour, 4 hours), so a timer can be used to determine when to discard location and orientation information when stored location and orientation information has not been replaced with more current location and orientation information.

FIG. 3 depicts an example system 300 that includes a computer system 302 that selects and provides content for presentation on a display device 304. The computer system 302 can include one or more of any of a variety of computing devices, such as desktop computers, laptop computers, media computing devices, embedded computing devices (e.g., computing devices embedded in the display device 304), computer servers, distributed computing devices (e.g., cloud computing systems), mobile computing devices (e.g., smartphones, tablet computing devices), or any combination thereof.

The computer system 302 is depicted as including a data collection subsystem 306 that collects location and orientation information for users from user computing devices, such as from the example user computing device 307. The data collection subsystem 306 can collect location and orientation information from user computing devices in any of a variety of appropriate manners, such as those described above with regard to systems 200, 240, and/or 270 in FIGS. 2A-C. The data collection subsystem 306 can collect additional and/or alternative information from user computing devices, such as user preference information (e.g., information that a user is interested in particular types of content, information that a user prefers content to be provided in one or more particular formats, etc.), changes in associations between users and user computing devices (e.g., a different user has logged into a user computing device), and/or information that identifies other users and/or user computing devices that are located near the user. The data collection subsystem 306 can store obtained location information, orientation information, and other information in the user location repository 326 and/or the user information repository 328. This information can be stored for later use to select content to display on the display device 304 based on which users are located near and facing the display device 304.

A location query subsystem 308 can be included in the computer system 302 and can provide responses to location-based content requests from user computing devices. The location query subsystem 308 can serve requests for location-based content similar to the computer system 204 that is described above with regard to FIG. 2A. Information received in location-based content requests by the location query subsystem 308 can be stored in the user location repository 326. Additionally, the location query subsystem 308 can interact with a content selection module 310 to identify location-based content to provide to a user computing device in response to a request for such information. The location query subsystem 308 can provide to the content selection module 310 information specified in a request from a user computing device (e.g., location information, orientation information, user identifier) as well as additional information (e.g., information from the user information repository 328 that identifies a user's role in one or more organizations, information from the user location repository 326 that identifies one or more other users who are located near the requesting device and/or roles for those users, information that identifies a display device that is located near the user, information that identifies content that is currently being presented on the nearby display). Based on this information, the content selection module 310 can identify appropriate content from a content repository 330 and provide the identified content to the location query subsystem 308.

The location query subsystem 308 can additionally use one or more applications 312 to analyze and configure content for delivery and presentation on a user computing device. The applications can be specific to certain types of content. For example, a business intelligence application 314 is depicted as an example application that can take real-time and/or historical business data (e.g., sales data, shipping data, order information, resource information) as input and can provide business intelligence information as output. For instance, the business intelligence application 314 can receive from the content repository 330 real-time business information associated with a particular location where a user computing device is located. In response, the business intelligence application 314 may generate information to populate a business intelligence dashboard (interface with multiple different types of analytics displayed concurrently on a display) for the particular location. The location query subsystem 308 can use content output by the one or more applications 312, such as the business intelligence application 314, and can provide the information to an appropriate user computing device and/or display device 304.

The computer system 302 additionally includes a user selection subsystem 316 that selects users who are located near the display device 304 and/or likely to be facing the display device 304. The user selection subsystem 316 includes a location module 318 that analyzes information in the user location repository 326 to identify users who are located within a threshold distance of the display device 304. The location module 318 can further use the information in the user location repository 326 to select a subset of such users who are likely standing in front of the display device 304. The user selection subsystem 316 also includes an orientation module 320 that can identify users who are facing the screen of the display device 304 based on information identified in the user location repository 326. The user selection subsystem 316 can make such determinations similar to the discussion above with regard to the computer system 108 depicted in FIG. 1. The user selection subsystem 316 may initiate identification of users in response to requests (e.g., requests from the display device 304 for content), in response to detecting that the context surrounding the display device 304 has changed (e.g., the user selection subsystem 316 can monitor information in the user location repository 326 to determine when users located near and/or facing the display device 304 have changed), and/or at various intervals of time (e.g., every second, every 5 seconds, every 10 seconds, every 15 seconds, every 30 seconds, every minute, every 5 minutes, every 15 minutes).

In some implementations, the number of users who are selected by the user selection subsystem 316 may be too large to reasonably accommodate with relevant content. For example, if the display device 304 is located in an auditorium that is filled with hundreds of people from an organization, it may not be possible to identify content that is relevant to all of the users who are located near and likely viewing the display device 304. As a result, the user selection subsystem 316 may proactively prune the subset of users when the number of users included in the subset is greater than or equal to a threshold number (e.g., 5 users, 10 users, 15 users, 25 users, etc.). A variety of techniques can be used to remove users from the subset of users. In a first example technique, the subset of the users can ordered by their roles within an organization such that the users with the greatest authority (e.g., executives) are ordered at the beginning of a list and the users with the least authority within the organization are at the end of the list. A threshold number of users can then be selected by the user selection subsystem 316 from the ordered list beginning with the first user on the list and moving down the list in descending order. In a second example technique, the subset of the users can be organized into groups based on their roles within an organization and the groups having the greatest representation (e.g., mode of the subset of users based on role within the organization) can be selected until at least a threshold number of users have been selected. For instance, if manager is the most represented role within the subset of users (the mode of the subset of users with regard to role), the managers can be selected as the subset of users by the user selection subsystem 316 and content that is relevant to the managers can be provided on the display device 304.

With a subset of the users who are located near and/or facing the display device 304 selected by the user selection subsystem, the content selection module 310 can select appropriate content to provide to the display device 304 for presentation to the users. The content selection module 310 can interact with a user role module 322 to identify roles for users within the subset of the users within one or more organizations. The user role module 322 can make such identifications based on information stored in the user information repository 328, which can store a variety of information regarding users including information that identifies user roles. The content selection module 310 can use the user role information for the subset of the users as well as information that identifies one or more tasks that are being performed at or near the display device 304 to select appropriate content from the content repository 330. The content selection module 310 can additionally interface with one or more of the applications 312, such as the business intelligence application 314, to synthesize and identify appropriate content for the selected subset of the users and/or the particular display device 304.

A display interface 324 can convert the content selected by the content selection module 310 into one or more appropriate formats (e.g., resolution, video encoding, audio encoding) for presentation on the display device 304 and can transmit the selected content to the display device 304. The display interface 324 can use an input/output (I/O) interface 332 of the computer system 302 to transmit the formatted content to the display device 304 over one or more networks 334. The I/O interface can be any of a variety of interfaces to transmit content over the network 334, such as a wireless network card and/or a video card. The network 334 can include any of a variety of connections between the computer system 302 and the display device 304, such as, for example, a wireless network (e.g., Wi-Fi network, a wireless data network (e.g., a 3G/4G network), a cellular telephone network, a wired network (e.g., a direct video cable connection between the computer system 302 and the display device 304, a wired LAN), or any combination thereof.

The display device 304 includes an I/O interface 336 through which content can be received from the computer system 302, a display 338 through which the content can be visually output, and speakers 340 through which the content can be audibly output by the display device 304. The display device 304 can be a traditional display, such as a flat screen television (e.g., LED television, LCD television, plasma television), a computer monitor, and/or a projector and projection surface (e.g., screen). In some implementations, the display device 304 can be an enhanced display, such as a 3D display (e.g., display providing 3D effects through the use of special glasses that alternate the transmission of images through the left and right lenses in synchronization with the frame rate of the display) and/or a display that concurrently presents multiple different images to different users (e.g., SONY SIMULVIEW display technology that uses special glasses to alternate the transmission of images to different users in synchronization with the frame rate of the display). For instance, an enhanced display device can be used to select and present different content to different users and/or groups of users at the same time. For example, a first group of users that include executives may be presented with first content on the display device 304 while a second group of users that include managers are presented with second content (different from the first content) on the display device 304, all while a third group of users that include workers are presented with third content (different from the first and second content) on the display device 304.

The example user computing device 307 can be any of a variety of computing devices, such as a laptop computer, a smartphone, a tablet computing device, and/or a PDA. The user computing device 307 includes a location/orientation communication unit 342 that can transmit the location and/or orientation information for the user computing device 307 to the data collection subsystem 306 of the computer system 302 over the network 334 using an I/O interface 344. The user computing device 307 can further include a user identifier 346 that identifies a current user of the user computing device 307. For example, the user identifier 346 can be credentials for a user who has logged into the user computing device 307 and/or an application executing on the user computing device, a username for the user, an email address, a telephone number, and/or a social network identifier. The location/orientation communication unit 342 can provide the user identifier 346 with location and/or orientation information that is provided to the data collection subsystem 306 so as to identify a user to whom the location/orientation information is associated.

The user computing device 307 can further include a location query client 348 that can provide requests for location-based content to the location query subsystem 308 of the computer system 302, similar to the requests provided by the user computing device 202 to the computer system 204 as described above with regard to FIG. 2A. Content received by the location query client 348 can be presented to a user of the user computing device 307 using a display 350.

The components of the computer system 302 and/or the user computing device 307 can be implemented in hardware (e.g., application specific integrated circuits (ASICs)), software, firmware, or any combination thereof.

Figure 4:
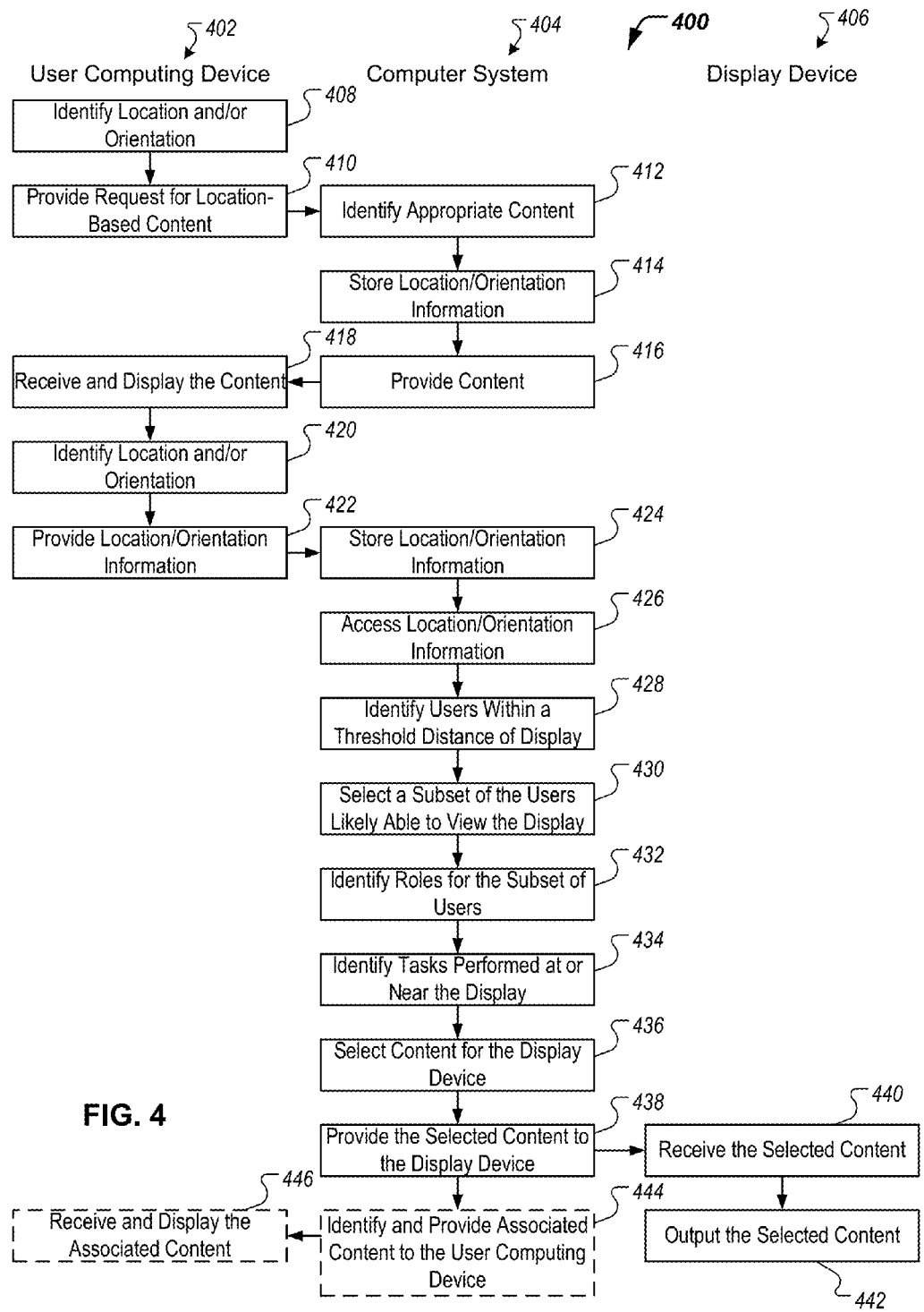
FIG. 4 is a flowchart of an example technique for selecting content to provide for presentation on a display device.

FIG. 4 is a flowchart of an example technique 400 for selecting content to provide for presentation on a display device. Portions of the example technique are identified in FIG. 4 as being performed by a user computing device 402, a computer system 404, and a display device 404. The user computing device 402 can be any of a variety of user computing devices and can be similar to the user computing devices 106a-e, 202, 250a-e, 272, and/or 307. The computer system 404 can be any of a variety of computer system and can be similar to the computer systems 108, 204, 252, 276, and/or 302. The display device 406 can be any of a variety of display devices and can be similar to the display devices 102, 244, and/or 304.

The user computing device 402 can identify a current location and/or orientation of the user computing device (402). For example, the user computing device 202 can identify its current location based on GPS and/or available wireless network signals, and can identify its current location using a digital compass that is part of the user computing device 202, as indicated by step A (206). Using the location and/or orientation information, the user computing device can provide a request (e.g., query) for location-based content to display on the user computing device 402 (410). For example, the user computing device 202 can provide the request 210 to the computer system 204 with the location information 212, the user identifier 214, and/or the orientation information 216.

The computer system 404 can receive the request from the user computing device 402 and, in response, can identify appropriate content (412). For example, the computer system 204 can identify content from the content repository 226 that is relevant to the current location of the user computing device 202, a direction (orientation) that the user computing device 202 is facing at the location, a role that the user identified by the user identifier 214 has in one or more organizations, and/or the identities and/or roles of other users who are located near the user computing device, as indicated in the user location repository 230. The computer system 404 can store the location and/or orientation information for the user computing device (414). For example, the computer system 204 can store the location and orientation information for the user computing device 202 in the user location repository 230. The computer system 404 can provide the identified content to the user computing device 402 (416), and the user computing device 402 can receive and display the content (418).

The steps 408-418 can be one technique by which the computer system 404 can obtain location and/or orientation information for the user computing device 402. An additional and/or alternative technique for obtaining location and/or orientation information for the user computing device 402 is described below with regard to steps 420-424.

The user computing device 402 can identify location and/or orientation information (420) and provide the identified information to the computer system 404 (422). For example, the computing devices 272 and 274 can identify location and/or orientation information and can periodically provide the identified information to the computer system 276, as indicated by step A (286). In another example, the user computing devices 250a-e can identify location and/or orientation information in response to receiving a signal from the wireless transceiver 242 and can provide the identified information in response to the signal, as indicated by step B (254). A user computing device may also provide location and/or orientation information on connection with a request for content, as described above with regard to steps 408 and 410.

The computer system 404 can receive the provided location and/or orientation information and can store the information (424). For example, the computer system 252 can store the location and/or orientation information for the user computing devices 250a-e in the user location repository 269, as indicated by step D (268). In another example, the computer system 276 can store the location and/or orientation information for the user computing devices 272 and 274 in the user location repository 292, as indicated by step C (290).

The computer system 404 can access the stored location and/or orientation information (426) and can use the identified location and/or orientation information to identify users who are within a threshold distance of the display device 406 (428). For example, the computer system 108 can obtain location and/or orientation information for users who are located near the display, as indicated by step A (110). In another example, the user selection subsystem 316 can use information in the user location repository 326 to identify users who are located within a threshold distance of the display device 304.

The computer system 404 can select a subset of the users who are likely able to view the display (430). For example, the computer system 108 can select a subset of the users 104a-e that are likely able to view the display device 102, as indicated by step B (112). In another example, the user selection subsystem 316 can use the location module 318 and/or the orientation module 320 to identify a subset of the users who are likely able to view content that is displayed by the display device 304.

The computer system 404 can identify roles for users within the selected subset of users within one or more organizations (432) and can identify one or more tasks that are performed at or near the location of the display device 406 (434). For example, the computer system 108 can identify one or more tasks that are performed within a threshold distance of the display device 102 and can identify roles for the subset of the users, as indicated by step C (116). In another example, the content selection module 310 can identify one or more tasks that are performed at or near the display device 304 and/or roles for users within the selected subset of users with the user role module 322.

The computer system 404 can select content for the display device 406 that is relevant to the selected subset of the users, to the roles of the users within the selected subset of the users, and/or to the tasks that are performed at or near the display device 406 (436). For example, the computer system 108 can select such content at step D (118) and the computer system 302 can use the content selection module 310 and the content repository 330 to select such content for presentation on the display device 304.

The computer system 404 can provide the selected content to the display device 406 (438) and the display device 406 can receive (440) and output the selected content (442). For example, the computer system can provide the selected content 122 to the display device 102 for presentation on a display of the display device 102.

In some implementations, the computer system 404 can additionally identify content for presentation on the user computing device 402 that is associated with the selected content that was provided to the display device 406 (444). For example, the associated content can be additional content that annotates portions of the selected content, the additional content include some portions of the selected content, and/or can include controls that a user of the user computing device 402 can use to request that the selected content presented on the display device 406 be changed/modified. Such additional content can be provided to the user computing device 402 in conjunction with the selected content being provided to the display device 406. For example, when the computer system 108 provides the content 122 to the display device 102, the computer system 108 can provide additional associated content to one or more of the user computing devices 106a-e. In some implementations, the additional content may only be provided to user computing devices (e.g., the user computing devices 106b and 106c) for users within the subset of the users for whom the selected communal content for the display device 102 was generated. The user computing device 402 can receive and display the associated content that was provided by the computer system 404 (446).

For example, if several users who are workers in an organization are located near a communal display device, such as the display device 102, and another user who is an executive is also located near the communal display device, the content that is selected for display on the communal display device may include only some information that is relevant to the executive based on other content that is also displayed being more relevant to the workers. The additional content that is selected for presentation on and provided to the executive's computing device may be content that is specifically intended for the executive, such as a financial report for the organization that is not relevant to the workers.

Figure 5:
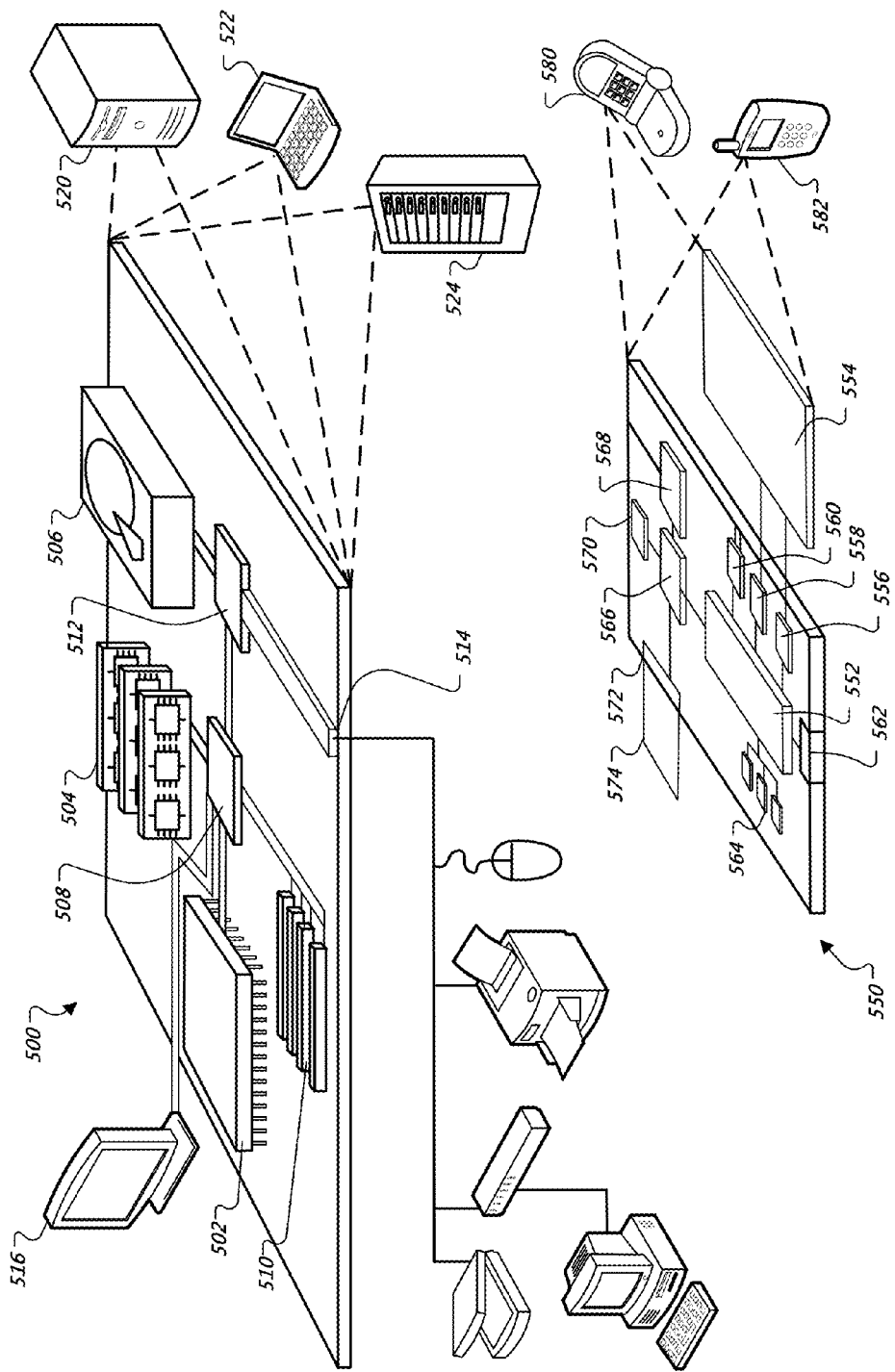
FIG. 5 is a block diagram of example computing devices.

FIG. 5 is a block diagram of example computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other display technology. The display interface 556 may comprise circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although some implementations have been described in detail above, other modifications are possible. Moreover, other mechanisms for selecting content to provide to display devices may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   identifying a size of the display device;
   identifying a size of content displayed on the display device;
   determining a threshold distance from the display device based on the identified size of the display device and the identified size of the content displayed on the display device;
   identifying, at a computer system, a plurality of users who are located within the determined threshold distance of the display device;
   selecting, by the computer system, a subset of the plurality of users based on location information that indicates current locations of the plurality of users relative to a location of the display device and orientation information that indicates directions that the plurality of users are facing, the selecting comprising excluding, from the subset of the plurality of users, users that are not facing the display device as indicated by the orientation information;
   identifying, by the computer system, roles of individual users within the subset of the plurality of users;
   identifying, by the computer system, one or more tasks performed within the threshold distance from the display device, the one or more tasks being different from the roles of individual users within the subset of the plurality of users;
   selecting business intelligence data content to present on the display device based, at least in part, on identities of the individual users within the subset of the plurality of users, the roles of the individual users within the subset of the plurality of users, and the one or more tasks performed within the threshold distance from the display device; and
   causing, by the computer system, the selected business intelligence data content to be presented on the display device.

2. The computer-implemented method of claim 1, wherein the display device comprises a display device that is mounted to a wall.

3. The computer-implemented method of claim 2, wherein the display device is located in a room or area that is used for one or more tasks.

4. The computer-implemented method of claim 1, wherein selecting the subset of the plurality of users comprises selecting one or more users determined to be located in front of the display device such that the one or more users are likely able to view media output by the display device.

5. The computer-implemented method of claim 4, wherein selecting one or more users determined to be located in front of the display device such that the one or more users are likely able to view media output by the display device comprises:
   accessing, by the computer system, the display device location information, wherein the display device location information includes a direction that the display device is facing and a viewing angle for the display device;
   comparing, by the computer system, the display device location information with the location and orientation information of the plurality of users; and
   identifying, based on the comparison, one or more of the plurality of users that can view the display device.

6. The computer-implemented method of claim 1, further comprising obtaining the location information by communicating with a plurality of mobile computing devices that are associated with the plurality of users.

7. The computer-implemented method of claim 6, wherein communicating with a plurality of mobile computing devices that are associated with the plurality of users comprises:
   receiving, at the computer system, requests from the plurality of mobile computing devices for content that is relevant to the current locations of the plurality of users, wherein the requests identify the current locations of the plurality of users and include user identifiers that identify the plurality of users associated with the plurality of mobile computing devices; and
   providing, to the plurality of mobile computing devices, the content that is relevant to the current locations of the plurality of users;
   wherein the method further comprises:
   storing, by the computer system, information from the requests that associates the user identifiers with the current locations as the location information; and
   retrieving, by the computer system at a later time, the location information to use for selecting the content to present on the display device.

8. The computer-implemented method of claim 6, wherein communicating with a plurality of mobile computing devices that are associated with the plurality of users comprises:
   receiving, at the computer system and from a wireless transceiver that is located near the display device, responses from the plurality of mobile computing devices to a wireless signal that is transmitted by the wireless transceiver, wherein the responses from the plurality of mobile computing devices to the wireless signal indicate that the plurality of mobile computing devices are within range of the wireless signal and are located near the display device.

9. The computer-implemented method of claim 6, wherein communicating with a plurality of mobile computing devices that are associated with the plurality of users comprises periodically receiving, at the computer system, updated location information from the mobile computing devices;

wherein the method further comprises:
  storing, by the computer system, the updated location information as the location information; and
  retrieving, by the computer system at a later time, the location information to use for selecting the content to present on the display device.

10. The computer-implemented method of claim 1, wherein the location information includes one or more of: global positioning system (GPS) data, identities of nearby wireless networks, and information that identifies nearby wireless computing devices.

11. The computer-implemented method of claim 1, wherein the orientation information that indicates the directions that the plurality of users are facing includes cardinal direction information.

12. The computer-implemented method of claim 1, wherein the orientation information that indicates the directions that the plurality of users are facing includes information that indicates a degree of orientation relative to a particular direction.

13. A system comprising:
  a display device;
  one or more computing devices that control media that is output by the display device;
  a user selection subsystem that is installed on the one or more computing devices and that is programmed to identify a size of the display device, identify a size of content displayed on the display device, determine a threshold distance from the display device based on the identified size of the display device and the identified size of the content displayed on the display device, identify a plurality of users who are located within the determined threshold distance of the display device, and to select a subset of the plurality of users based on location information that indicates current locations of the plurality of users with regard to a location of the display device and orientation information that indicates directions that the plurality of users are facing, the user selection subsystem excluding from the subset of the plurality of users, users that are not facing the display device as indicated by the orientation information;
  a user roles module that is installed on the one or more computing devices and that is programmed to identify roles of the subset of the plurality of users;
  a content selection module that is installed on the one or more computing devices and that is programmed to select business intelligence data content to present on the display device based, at least in part, on identities of users within the subset of the plurality of users, the roles of the individual users within the subset of the plurality of users, and the one or more tasks performed within the threshold distance from the display device, wherein the one or more tasks are different from the roles of individual users within the subset of the plurality of users; and
  a display interface that is programmed to cause the selected business intelligence data content to be presented on the display device.

14. The computer system of claim 13, wherein the display device comprises display that is mounted to a wall.

15. The computer system of claim 14, wherein the display device is located in a room or area that is used for one or more tasks.

16. The computer system of claim 13, wherein the orientation information that indicates the directions that the plurality of users are facing includes cardinal direction information.

17. The computer system of claim 13, wherein the orientation information that indicates the directions that the plurality of users are facing includes information that indicates a degree of orientation relative to a particular direction.

18. A non-transitory computer program product embodied in a computer-readable storage device storing instructions that, when executed, cause one or more computer processors to perform operations comprising:
  identifying a size of the display device;
  identifying a size of content displayed on the display device;
  determining a threshold distance from the display device based on the identified size of the display device and the identified size of the content displayed on the display device;
  identifying a plurality of users who are located within the determined threshold distance of the display device;
  selecting a subset of the plurality of users based on location information that indicates current locations of the plurality of users relative to a location of the display device and orientation information that indicates directions that the plurality of users are facing, the selecting comprising excluding, from the subset of the plurality of users, users that are not facing the display device as indicated by the orientation information;
  identifying, by the computer system, roles of individual users within the subset of the plurality of users;
  identifying, by the computer system, one or more tasks performed within the threshold distance from the display device, the one or more tasks being different from the roles of individual users within the subset of the plurality of users;
  selecting business intelligence data content to present on the display device based, at least in part, on identities of the individual users within the subset of the plurality of users, the roles of the individual users within the subset of the plurality of users, and the one or more tasks performed within the threshold distance from the display device; and
  causing the selected business intelligence data content to be presented on the display device.

19. The computer program product of claim 18, wherein the display device comprises a display device that is mounted to a wall.

20. The computer program product of claim 19, wherein the display device is located in a room or area that is used for one or more tasks.

21. The computer program product of claim 18, wherein the orientation information that indicates the directions that the plurality of users are facing includes cardinal direction information.

* * * * *